United States Patent Office 3,702,798
Patented Nov. 14, 1972

3,702,798
VITREOUS FIBERS BONDED WITH A THERMOSET RESIN INCLUDING TWO ORGANO-SILICON COMPOUNDS
Richard F. Shannon, Lancaster, Ohio, assignor to Owens-Corning Fiberglas Corporation
No Drawing. Continuation of application Ser. No. 465,196, June 18, 1965. This application Aug. 14, 1969, Ser. No. 861,214
Int. Cl. D04h 1/30
U.S. Cl. 161—170                    10 Claims

ABSTRACT OF THE DISCLOSURE

A vitreous fiber product which is a mass of intermeshed and felted fibers of glass or other vitreous material bonded to one another at points of contact by a thermoset synthetic resinous material which includes two specific and different organo silicon compounds, or equivalents therefor.

This application is a continuation of application Ser. No. 465,196, field June 18, 1965, and now abandoned.

This invention relates to a vitreous fiber product, and, more particularly, to such a product which is a mass of intermeshed and felted fibers of glass or other vitreous material bonded to one another at points of contact by a thermoset synthetic resinous material which includes two specific and different organo silicon compounds, or equivalents therefor.

Vitreous fiber products of the type contemplated by the instant invention are well known, and can be produced in any of several known manners. For example, streams of molten glass of suitable composition can be drawn through minute orifices and accelerated rapidly, as by blasts of steam, toward a foraminous conveyor on which they are collected. The rapid acceleration causes attenuation of the molten glass to a desired fiber diameter. A thermosetting binder composition, frequently including a phenolic resole, is usually associated with the fibers as they are being projected toward the conveyor, and forms a discontinuous coating on the intermeshed fibers. The collected mass of intermeshed fibers and associated binder is then advanced to a curing oven where the binder is converted to a thermoset condition. The final product can be wool-like if the mass is unconfined within the curing oven, or board-like and having an apparent density up to about 12 or 14 pounds per cubic foot if the mass is compressed during curing. Similar products can also be produced by other fiber-forming techniques, for example by advancing rodlets of glass into a blast of hot, high velocity combustion products, by throwing streams of molten glass centrifugally through small openings in the periphery of a centrifuge basket, and usually into a blast of steam or combustion products, or by flowing a relatively large diameter stream of molten rock or slag composition into a blast of steam or the like. Apart from the details of the fiber-forming operation itself, the process for making the wool-like or board-like products is generally the same as that described above.

A binder composition suitable for use in producing materials of the type indicated from glass or other vitreous fibers should desirably flow to a substantial extent when it comes into contact with the relatively hot fibers, and, after cure, it must be highly water repellent, firmly adhered to the fibers, and highly resistant to moisture, particularly of the type encountered under conditions of relatively high humidity. It has been found that conventional surface active agents, which might appear to be logical materials to incorporate in an aqueous binder system to increase the flow thereof, are disadvantageous because they markedly reduce the humidity resistance of the final products, and also reduce the water repellency of the thermoset binders.

The present invention is based upon the discovery that aqueous binder systems comprising a thermosetting synthetic resinous material and minor amounts of organo silicon compounds of two different types can be used in the manner indicated above in the production of intermeshed masses of glass or other vitreous fibers, and that, as a result of the combined and cooperative actions of the two types of organo silicon compounds, the flow of the binder composition on the fibers is increased, as well as the water repellency and humidity resistance of the final products and the adherence of the thermoset binder to the fibers.

It is, therefore, an object of the invention to provide an improved glass or other vitreous fiber product.

It is a further object of the invention to provide such a product which is a mass of intermeshed vitreous fibers bonded to one another at points of contact by a thermoset binder composition which includes organo silicon compounds of two different types.

It is still another object of the invention to provide a method for producing an improved glass or other vitreous fiber product.

Other objects and advantages will be apparent from the description which follows, which is intended only to illustrate and disclose the invention, and is in no way to be construed as a limitation thereon.

The invention will be more fully understood from the following description of a specific embodiment, which constitutes the best presently known mode for practicing thereof.

EXAMPLE 1

A binder composition was prepared in a mixing tank provided with a propeller-type agitator. The tank was first charged with 500 gallons of water, and the agitator was then actuated to stir the water and subsequently charged ingredients constantly until completion of the formulation of the composition. The following ingredients were then added, in the amounts and in the order listed: 5 gallons of 20 percent ammonium hydroxide, 0.8 pound of gamma aminopropyltriethoxysilane, 102 gallons of Phenolic Resin $A^1$, 21 gallons of a 50 percent water emulsion of mineral oil emulsified with stearic acid and ammonium caseinate, 1 pound of Silicone Copolymer $A^2$, and sufficient water, about 300 gallons, to provide a formulation containing about 10 percent solids. Agitation was continued for a few minutes after the final water addition to assure substantial uniformity of the completed binder composition.

The binder composition produced as described above was sprayed into a forming hood through which glass fibers were being projected onto a foraminous conveyor. The fibers were collected in the form of a randomly intermeshed wool-like mass associated with the binder composition. The relative proportions were such that the binder, after cure thereof, constituted approximately 6 to 7 percent of the total wool-like mass. Cure was accomplished in an oven maintained at a temperature of about 450° F. through which the fibers and binder were passed to provide an exposure of about 5 minutes. During cure, the mass was compressed sufficiently that a board-like product having an apparent density of about 4½ pounds per cubic foot, on the average, was produced. The wet and dry bond strengths of the board, measured by a standard test,[3] were found to be about ---
[1] Subsequently identified.
[2] Subsequently identified.
[3] Subsequently described.

100 percent higher than the dry bond strength of a control board identical therewith except that the gamma aminopropyltriethoxysilane and Silicone Copolymer A were omitted from the binder composition. The wet bond strength of the control board was only about 5 to 10 percent of the dry bond strength thereof. Careful microscopic examination of the board-like product according to the invention indicated substantially greater flow of the binder composition on the fibers than did corresponding examinations of the control board. The increased bond strengths resulted both from improved adhesion between the binder composition and the fibers and from the greater flow of the binder prior to curing which caused an increase in the number of fiber junctures that were bonded.

The procedure described in the preceding paragraph has also been repeated except that the proportion of the binder composition was reduced so that it constituted about 5 percent of the final product, and except that the wool-like mass of intermeshed glass fibers were not compressed during cure. The final product produced by this method was wool-like in nature, and had an apparent density of about 3 pounds per cubic foot. The wet and dry bond strengths of the wool-like product, measured by the standard test, were found to be about 100 percent higher than the dry bond strength of a control wool identical therewith except that the gamma aminopropyltriethoxysilane and Silicone Copolymer A were omitted from the binder composition. The wet bond strength of the control wool was only about 5 to 10 percent of the dry bond strength thereof. Careful microscopic examination of the wool-like product according to the invention indicated the substantially greater flow of the binder composition on the fibers that was noted in the board product.

It has been found that the flow of a binder composition on a glass fiber product, prior to cure of the composition, can be increased by additions of conventional surface active agents. For example, a binder composition can be produced as described in Example 1, except that 1 pound of a polyoxyethylene sorbitan monopalmitate which is commercially available under the trade designation "Tween 40" is substituted for the Silicon Copolymer A. Such binder composition, when applied to glass fibers in the manner described, flows to about the same extent, prior to cure, as does the composition with Silicone Copolymer A. However, after cure of the binder the presence of the polyoxyethylene sorbitan monopalmitate is undesirable, softening the binder, and substantially increasing the sensitivity thereof to moisture. It has been found that both Silicone Copolymer A and the polyoxyethylene sorbitan monopalmitate are effective to reduce the surface tension of a binder composition below about 30 dynes per centimeter, and this is believed to be the principal phenomenon involved in causing increased flow of the binder prior to cure. Silicone Copolymer A is hydrophilic to a substantial extent in the binder composition. However, it has also been found that Silicone Copolymer A is converted to a hydrophobic condition when subjected to the elevated temperatures involved in cure of the binder composition. This conversion of Silicone Copolymer A, during cure of the binder, enables its use as described to improve flow prior to cure, and without a corresponding detriment subsequent to cure. The detriment caused by polyoxyethylene sorbitan monopalmitate is attributed to its retention of its hydrophilic nature after having been subjected to the elevated temperature conditions which prevail during cure.

Phenolic Resin A was a phenol formaldehyde partial condensation product produced from 180 parts of formalin (a 37 percent water solution of formaldehyde), 100 parts of phenol, and 4 parts of sodium hydroxide. The starting materials were mixed in a suitable vessel, allowed to stand at room temperature (about 70° F.) for approximately 16 hours and heated at a progressively increasing temperature which was sufficient to maintain gentle boiling thereof. Heating was discontinued when the temperature of the reaction mixture reached approximately 180° F. Sodium hydroxide in the reaction mixture was then neutralized with phosphoric acid; the resulting neutralized phenolic resole was filtered; and the water content was adjusted to provide an aqueous solution of 50 percent solids.

Silicone Copolymer A is commercially available from Union Carbide & Carbon Corporation under the designation "L-520 Silicone." It has substantially the following structure:

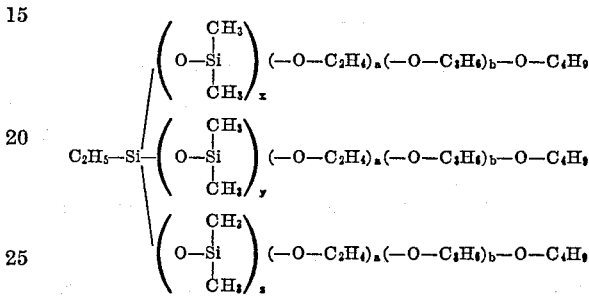

$a$, $b$, $x$, $y$ and $z$ are integers. The sum of $x$, $y$ and $z$ is approximately 20. The silicone portion is about 25 percent by weight, and the polyol about 75 percent by weight. The polyol portion is butoxy chain stopped on one end and is essentially "Ucon HB-660" polyol, a trade designation for a product of Union Carbide & Carbon Corporation. "Ucon HB-660" polyol has the following properties:

Viscosity index (ASTM D-567-53) -- 144.
Viscosity Saybolt seconds at:

| | |
|---|---|
| 210° F. | 545° F. |
| 100° F. | 125. |
| 0° F. | 660. |
| Refractive index | 30,700. |
| Pour point, ° F. | 1.459. |
| Vapor pressure | −30. |
| | 0.01 mm. Hg at |
| Flash point (open cup) | 68° F. |
| Fire point (open cup) | 440° F. |

A material substantially identical with Silicone Copolymer A is also available commercially from the General Electric Company under the trade designation "SF-1934" silicone. Both of the commercially available materials to which reference has been made above contain minor amounts of a stabilizer additive.

Examples of other binder compositions which have been used in the manner described above with glass fibers and have been found to have improved flow characteristics and to form a final product wherein the binder composition is tightly adhered to the fibers and which is highly water repellent and resistant to moisture are set forth in Table I,[4] below:

---

[4] The constituent "Vinsol" used in the binder compositions set forth in Table I is the residue left after rosin and turpentine distillation of the extract from the heartwood of southern pine stumps which have been left after a lumbering operation and several years seasoning. This residue is a hard, friable, high melting (above 190° F.) natural thermoplastic resin. Its chemical composition is a complex mixture of chemically uncharacterized resinous components which include phenols, phenol ethers, and polyphenols. The approximate composition is as follows: 6% high melting furfural condensate: 4% Neutral oils (hydrocarbons, esters and ethers carrying the Vinsol odor); 9% rosin (approximate old quality FF); 5% Belrophenol-lactone (probably $C_{15}M_{14}O_3 \cdot 2$ ($OCH_3OH$)); 5% Flavene type polyphenol (possibly $C_{15}H_7O_2OH$); 2% fumic acid type compounds; 0.2% pectic acid type compounds; 6% air oxidized rosin acids; 3% strongly acidic compounds; 38% weekly acidic, high melting phenolic compounds; 19% relatively neutral phenol ethers and esters; 1% water soluble carbohydrates, etc.

TABLE I

| Composition number | 1 | 2 | 3 | 4 | 5 | 6 | 7 |
|---|---|---|---|---|---|---|---|
| Binder composition: | | | | | | | |
| Water, gal | 594.00 | 500.0 | 725.0 | 690.0 | 861.0 | 99.0 | 318.0 |
| NH₄OH, gal | 11.00 | 30.0 | 10.0 | 21.0 | 10.0 | 17.0 | 12.0 |
| Gamma-amino propyltriethoxy silane (100% [1] solids), lb | 4.25 | 3.4 | 1.0 | 1.3 | 0.5 | 2.2 | 2.1 |
| Ammonium sulfate (100% solids), lb | 4.25 | 8.5 | 4.6 | 6.5 | 2.6 | 22.0 | 17.5 |
| Vinsol (40% solids), gal | 94.00 | 167.5 | 108.5 | 54.0 | 26.1 | 145.0 | 131.0 |
| Phenolic resin A (50% solids), gal | 272.00 | 222.0 | 108.0 | 220.0 | 86.0 | 339.0 | 139.0 |
| Mineral oil emulsion, gal | 14.3 | 36.0 | 42.0 | 20.5 | 14.0 | | |
| Silicone copolymer A (solids), lb | 8.5 | 28.3 | 4.6 | 10.8 | 4.0 | 1.1 | 6.4 |

[1] The terms "percent" and "parts" are used herein, and in the appended claims, to refer to percent and parts by weight, unless otherwise indicated.

It has been found that the unexpected cooperation between gamma aminopropyltriethoxysilane and equivalents therefore and Silicone Copolymer A and equivalents therefor is not dependent upon the specific identity of the thermosetting resinous material used in the binder composition. For example, other thermosetting phenolic resins can be used in place of Phenolic Resin A, as can thermosetting urea formaldehyde-, melamine formaldehyde-, dicyandiamide formaldehyde-, epoxy- and even polymerizable polyester- and other-resins. In general, for economic reasons, the thermosettable synthetic resin should be water dispersible or water soluble since aqueous binder systems can be used in the vicinity of glass melting tanks without the need for elaborate precautions which are necessary with solvent systems. Various thermosettable synthetic resins and their use in binder compositions for glass and other vitreous fibers are well known, and are commercially available. Water soluble or dispersible phenolic resoles, including those where urea, thiourea, melamine or dicyandiamide has been reacted chemically with the resole, most desirably in either case wherein the mol ratio of formaldehyde to phenol is from about 1.5 to about 2.3, constitute a preferred class of thermosettable binder resins because they are comparatively inexpensive and have physical properties which suit them admirably for such use. Examples of other thermosettable binder resins which have been used in place of Phenolic Resin A, and with substantially comparable results, are identified below:

PHENOLIC RESIN B

This resole was produced from 58 parts of phenol, 123.4 parts of formalin (a 37 percent solution of formaldehyde in water), and 12 parts of barium hydrate $$(Ba(OH)_2 \cdot 8H_2O)$$

These starting materials were mixed in a suitable vessel and heated with constant stirring by a propeller-type agitator. The charge first was heated to 110° F. and maintained at this temperature for approximately 3 hours, was then heated to and held at 120° F. for 5 hours, and finally was heated to and held at 140° F. for 2 hours. At this time the reaction mixture had a refractive index of 1.4620 and an infra-red absorption analysis thereof indicated that it was substantially free of unreacted phenol and also methylene groups. The reaction mixture had a free formaldehyde content of approximately 3.6 percent. The reaction product was then cooled to approximately 100° F., and neutralized with sulfuric acid to a pH of about 7.5. A 23.2 part charge of melamine was then added, and the resulting mixture, while under agitation, was heated to and maintained at approximately 140° F. for an additional 2 hour period. The reaction products were then cooled to approximately 75° F., and neutralized with further sulfuric acid to a pH of approximately 7.2. The reaction products had a free formaldehyde content of approximately ½ percent. Substantially all of the barium hydroxide catalyst was precipitated as barium sulfate, and the final product was substantially free of soluble ions. The final product was diluted with water to 40 percent solids.

PHONOLIC RESIN C

This resole was produced in the same manner as was phenolic Resin B, except that an equivalent amount of dicyandiamide was substituted for the melamine.

PHENOLIC RESIN D

This resole was produced in the same manner as was Phenolic Resin B, except that an equivalent amount of urea was substituted for the melamine.

It has also been found that silicone copolymers having the general formulas indicated below are equivalents for Silicone Copolymer A:

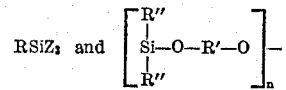

where R is an alkyl radical having from 1 to 3 carbon atoms, R' is an alkylene radical or a polyoxyalkylene radical, R'' is an alkyl radical having from 1 to 2 carbon atoms, n is an integer, and Z has the formula

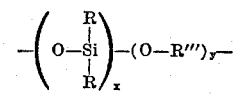

where R is an alkyl radical having from 1 to 3 carbon atoms, R''' is an alkylene radical having from 1 to 4 carbon atoms, and x and y are integers. Preferably, n has an average value from 2 to 10, and, most desirably, from 3 to 5; x and y are each at least 2; preferably x is from 3 to 8, and most desirably from 6 to 8, and y is from 8 to about 50, and most desirably from 20 to 40. The "Z" radicals may all be the same, or each may differ from the others, and, within each "Z" radical, the dialkyl siloxy and alkoxy groups may be the same or different. It will be appreciated that the "Z" group represented by the foregoing formula is incomplete, as it is bifunctional, and has only one bond to silicon. In actual practice, it is usually end-stopped by a suitable monofunctional group. The monofunctional groups of the several "Z" radicals of the silicone copolymer structure may be the same or different. The RSiZ₃ molecule has three "Z" groups, and, preferably, a total of from about 12 to 24 dialkyl siloxy units,

and from about 60 to 100 alkylenoxy units, —OR'''—, per molecule.

While the preferred RSiZ₃ silicone copolymer has three lower alkoxy end-stopped polyalkoxy dialkylsiloxy radicals, there may be a small amount of the copolymer present in which two or more polyalkoxy dialkylsiloxy radicals are not end-stopped but, instead, are connected to each other to form a cyclic structure. A silicone copolymer having a large proportion of such a cyclic structure, e.g., more than about 10 percent thereof, should be avoided, as such materials tend to be gels or rubbery solids, not easily mixed with thermosettable binder compositions.

The monofunctional group which usually end-stops the RSiZ$_3$ silicone copolymer preferably is a lower alkoxy so that the complete formula for the "Z" group is

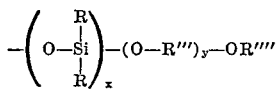

wherein R and R''' have the meanings set forth above, and OR'''' is an alkoxy radical having from 1 to 5 carbon atoms, and, preferably, 4 carbon atoms. The "Z" group of the RSiZ$_3$ silicone copolymer can also be end-stopped in any of several other ways, for example by a monomfunctional siloxy radical (e.g., —O—SiR$_3$), by a difunctional siloxy radical (e.g., the alkoxy-siloxy radical having the formula

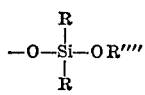

by an oxyglycol group (e.g., —O—R''' OH), or by other like radicals. The "Z" groups of the RSiZ$_3$ silicone copolymers, end-stopped as discussed above, have the following general formulas:

Monofunctional silane end-stopped

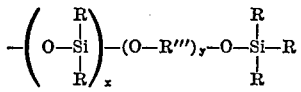

Alkoxysilane end-stopped

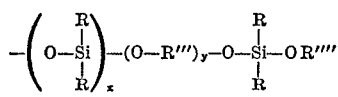

Glycol end-stopped

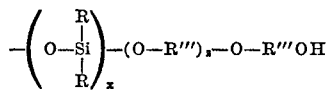

R, R''' and R'''', in the foregoing formulas, have the meanings previously set forth.

Whether an RSiZ$_3$ silicone copolymer is of a partially cyclic structure or is completely end-stopped in any of the manners set forth above, it is an essential characteristic thereof that each of the "Z" groups thereof consists essentially of repeating units

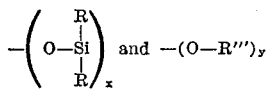

wherein the several symbols have the meanings previously set forth.

In general the monoalkyl-tri(polyalkoxydialkylsiloxy)-silicone copolymer may be produced by heating a monoalkyltri-(polydialkylsiloxy) silane, such as an ethyl-tri-(polydimethylsiloxy) silane containing on the average a total of about 20 dimethylsiloxy units per molecule, with a liquid glycol or polygycol and an end-stopper. The siloxy radicals of these silanes should have at least one terminal alkoxy group. Such monoalkyl-tri-(polydialkylsiloxy)-silanes and liquid glycols or polyglycols are available commercially and aso can be produced in manners well known in the art. The reaction mixture is heated, whereupon ester-exchange occurs between the glycol or polyglycol and the silane, and the repeating units represented above are formed, as well as an alcohol by-product from the alkoxy radicals of the silane. Frequently an acid or base catalyst is employed. The heating is preferably to a temperature sufficiently high that the alcohol by-product is vaporized, but low enough that the starting materials and product remain in the liquid phase. Such reactions are disclosed generally in U.S. Pat. 2,386,793 and German Pat. No. 940,885. When the identity of the end-stoppers is unimportant, the glycol and the silane are reacted in substantially the desired molar proportions, plete the chain stopping after the desired chain length is achieved. When a monofunctional silane is used as an end-stopper, the glycol and the silane should be reacted in substantially the desired molar proportions, and three mols of the monofunctional silane for each mol of the monoalkylsilane starting material added slowly to complete the chain stopping after the desired chain length is achieved. With some acidic end-stopping agents, the agent in a suitable amount may be admixed with the silane and the glycols or polyglycols prior to warming. In other preparations an alkylene oxide is reacted in place of the glycols or polyglycols with monoakyl-tri-(polysiloxy)-silane starting materials containing an active hydrogen on the siloxy terminal groups to provide the useful silane product employed in the invention.

Ester exchange occurs to form the repeating units, represented and discussed above, when an anhydrous reaction mixture consisting essentially of the ethyl-tri-(polydimethylsiloxy)-silane, a glycol, and an end-stopper, if desired, is heated. Any moisture in the reaction mixture, however, tends to hydrolyze the alkoxysilane or alkoxysilanes therein to the corresponding silanol or silanols and, if the effect of mass action is ignored,

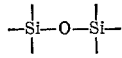

condensation will occur preferentially. It will be appreciated that it is virtually impossible to achieve anhydrous reaction conditions, especially in view of the hydrophilic nature of silanes employed. Statistically, therefore, it is to be expected that the resulting silane includes some higher molecular weight products containing additional

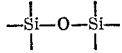

linkages and some cyclic structures even when anhydrous conditions are attempted. Desirably the copolymers are produced by essentially anhydrous copolymerization.

In view of the foregoing detailed discussion, it will be apparent that the useful RSiZ$_3$ silicone copolymers can be defined generically as consisting essentially of a monoalkyl siloxane group (a trifunctional group, sometimes called a "T" unit) and the aforediscussed repeating dialkylsiloxy units and alkoxy units. The identity of the chain-stopping group on the silane is relatively unimportant, so long as the silanes are sufficiently stable to enable convenient handling prior to incorporation in the binder composition. Preferably, the average molecular weight of such copolymers is from about 2100 to about 10,000, and most desirably from about 5000 to 7400. The ratio of dialkylsiloxy units to alkoxy units in the structure also is relatively unimportant so long as the ratio of the two provides a form, preferably liquid, of the copolymer which can be readily incorporated in the binder composition. The useful copolymers of this type can also be defined as having a molecular structure which includes the groups

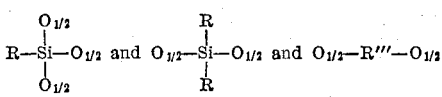

preferably in molar proportions of from 1:12:60 to 1:24:100, and desirably in molar proportions of about 1:20:80, where R and R''' have the meanings previously set forth.

A silicone copolymer having the general formula

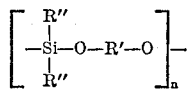

can be cyclic in nature, or can be made up of an end-stopped chain. In the former instance the copolymer can be represented as having the following generic formula

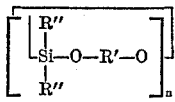

In the latter case, the copolymer can be end-stopped in any of several ways, for example by alkoxysilane groups, by monofunctional silanes, or by glycols. The copolymer, in these instances, can be represented as having one of the following generic formulas:

Monofunctional silane end-stopped

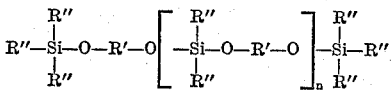

Alkoxysilane end-stopped

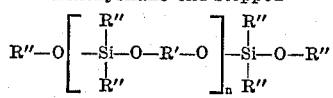

Glycol end-stopped

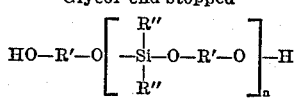

To produce such a copolymer, a dimethyldialkoxysilane, a diethyldialkoxysilane, or a methylethyldialkoxysilane is heated with a liquid glycol or polyglycol and an end-stopper, if used. Ester-exchange occurs, during heating, between the glycol or polyglycol and the silane, and the repeating unit represented above is formed, as well as an alcohol by-product from the alkoxy radicals of the silane. The heating is preferably to a temperature sufficiently high that the alcohol by-product is vaporized, but low enough that the starting materials and product remain in the liquid phase. Such a reaction is disclosed generally in U.S. Pats. 2,386,793. When end-stopping is not desired, the glycol and the silane should be reacted in substantially equimolecular proportions, and reaction should be continued until a desired chain length is achieved. When a monofunctional silane is used as an end-stopper, the glycol and the dialkylsilane should be reacted in substantially equimolecular proportions, and two mols of the monofunctional silane should be reacted per $n$ mols of the dialkylsilane, where $n$ is the integer from the foregoing formula for the repeating unit. When either the dialkylsilane or the glycol is used as an end-stopper ($n$ plus 1) mols thereof should be reacted with $n$ mols of the other, where $n$ is the integer from the foregoing formula for the repeating unit.

Ester exchange occurs to form the repeating unit represented and discussed above when an anhydrous reaction mixture consisting essentially of a dialkyldialkoxysilane, a glycol, and an end-stopper, if desired, is heated. Any moisture in the reaction mixture, however, tends to hydrolyze the alkoxysilane or alkoxysilanes therein to the corresponding silanol or silanols and, if the effect of mass action is ignored,

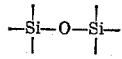

condensation will occur preferentially. It will be appreciated that it is virtually impossible to achieve anhydrous reaction conditions, especially in view of the hydrophilic nature of dialkyldialkoxysilanes. Statistically, therefore, it is to be expected that the resulting copolymer includes some

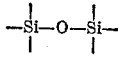

linkages even when anhydrous conditions are attempted. Operable copolymers are produced by essentially anhydrous copolymerization. Where some

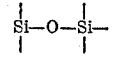

linkages are desired, an excess of the silane can be used, and copolymerization can be carried out in the presence of a limited amount of water, sufficient for reaction with the excess silane, or the product of essentially anhydrous copolymerization can be washed with water to effect hydrolysis and condensation.

In view of the foregoing detailed discussion, it will be apparent that the silicones can be defined generically as copolymers of a dialkyldialkoxysilane and a liquid glycol or polyglycol where the alkyl groups of the silane have from 1 to 2 carbon atoms. The identity of the alkoxy groups of the silane is not important, but, as a practical matter, they usually have from 1 to 4 carbon atoms. Preferably, the average molecular weight of the copolymer is from about 180 to about 2000, and the glycol has from 2 to 6 carbon atoms, or the polyglycol has from 4 to 16 carbon atoms. The copolymer can also be defined as having a molecular structure which includes the groups

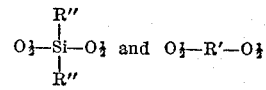

in molar proportions of from 2:1 to 1:2, where R' and R'' have the meanings previously set forth.

It will be appreciated that gamma-amino propyl triethoxy silane and equivalents are capable of hydrolysis. Since, in accordance with the invention, they are used in an aqueous coating system, it is possible that hydrolysis occurs before the coating is finally applied to glass fibers. However, ethoxy groups of a silane are comparatively difficultly hydrolylzed, for example by comparison with chloro groups, complete hydrolysis thereof usually proceeding readily only in the presence of an agent such as hydro chloric acid which accelerates the reaction. Since binder compositions with which the silane is used in accordance with the invention are usually of such a nature that they do not tend to accelerate the hydrolysis of an ethoxy or other alkoxy silane, it is probable that only partial hydrolysis proceeds prior to the application of the compositions to the fibers. However, when a binder composition comprising gamma-amino propyl triethoxy silane or an equivalent is applied to glass fibers, as described above, and heated in a suitable curing oven to convert the binder to a hardened, infusible condition, it is believed that substantially complete hydrolysis of the silane occurs prior to completion of the hardening of the binder. It is known that the rate of hydrolysis is a direct function of temperature. Since hardening of the binder composition is usually carried out at a temperature of at least 400° F., and often at a temperature from 450° F. to 525° F., and since any silane or reaction product molecule which has unhydrolyzed alkoxy groups as a part of its molecular structure is heated in an aqueous system during the initial portions of this curing cycle, substantially complete hydrolysis is believed to occur. In this connection, it should be noted that the rate of hydrolysis of the three ethoxy groups of gamma-amino propyl triethoxy silane differs substantially, a first being rather readily hydrolyzed, a second being hydrolyzed considerably more slowly than the first, and a third being hydrolyzed considerably more slowly than the second.

Neither the precise chemical structure of the gamma aminopropyltriethoxy silane hydrolysis or reaction product nor the mechanism of its attachment, if any, to the glass fibers is fully understood. It will be appreciated that a chemical linkage of the Si—O—Si type between a silicon atom from a silane and a glass surface can be hypothecated. For example, condensation between a silanol group from the silane and a silanol group which probably exists adjacent a glass fiber surface would provide such a chemical bond. It is doubted, however, that such a bond actually exists to any significant extent, as the adhesion that can be measured appears to be more of the order that would be expected from the attraction that can be attributed to hydrogen bonding or to Van der Waals forces. It is also possible that the silanol groups which are believed to be formed by hydrolysis, as discussed above, condense with one another to form siloxane or silicone groups, and, finally, it is probable that at least some of the amino groups from the silane are chemically bonded into the phenolic or other resin molecule through methylene groups. It will be apparent from the foregoing that the reactions which are responsible for the unexpected improvement achieved in accordance with the instant invention are too complicated and too little understood for a reliable chemical definition of the final product to be possible.

It has been demonstrated that gamma-amino propyl trimethoxy silane and all known commercially available amino alkyl silanes having the following generic formula are substantially equivalent to gamma-amino propyl triethoxy silane:

$$R_n'''''-Si(-O-R''''''')_{(4-n)}$$

wherein $R'''''$ is an amino alkyl radical chemically bonded to the silicon atom, $R''''''$ is an alkyl radical having from 1 to 4 carbon atoms, and $n$ is an integer from 1 to 3, inclusive. Specifically, fully equivalent results have been achieved using a silane having the following formula:

$$H_2NCH_2CH_2NHCH_2CH_2CH_2Si(-OCH_3)_3$$

A preferred class of such silanes is one wherein $R'''''$ has the formula $H_2N-R''''''$ where $R''''''$ is an alkylene radical having from 2 to 6 carbon atoms. Another such preferred class is one wherein $R'''''$ has the formula $$H_2N-R''''''NH-R''''''''-$$

where $R''''''$ and $R''''''''$ are both alkylene radicals having from 2 to 6 carbon atoms.

It has been determined that Silicone Copolymer A and the previously discussed equivalents therefor are effective in compositions according to the invention because, when added to an aqueous binder composition, they reduce the surface tension thereof to enable greater and more effective flow on glass fibers. To this extent, they behave as conventional surface active agents. However, during cure of the aqueous binder system, Silicone Copolymer A and the previously discussed equivalents therefor are chemically converted to a hydrophobic condition in which they do not behave as surface active agents; as a consequence of this chemical change, during cure of the binder, these materials improve the moisture resistance of glass fiber products, whereas conventional surface active agents adversely affect moisture resistance. It has also been found that a fugitive surface active agent, i.e., one which is volatilized, for example, during cure of the aqueous binder system, provide a benefit similar to that of Silicone Copolymer A. An example of a suitable, fugitive, surface active agent can be prepared by mixing 204 pounds of a silica sol containing 30 percent solids, 168 pounds of water, 15 pounds of 28 percent ammonium hydroxide solution and 53 pounds of tall oil fatty acids. Excellent results have been achieved using tall oil fatty acids having a Gardner color of 7, an acid number of 185, an iodine number of 133, a rosin acids content of 10 percent, a viscosity of 0.4 poise at 25° C., and a flash point of 210° C. Such tall oil fatty acids are available from Hercules Powder Company under the trade designation "Pamak 10." The resulting fugitive surface active agent, Silicone Copolymer A, or another equivalent therefor should, in general, be used in an aqueous binder system, in such proportions as are required to provide a surface tension not greater than 30 dynes uper square centimeter, most desirably not greater than 20 dynes per square centimeter.

In general, the amount of the gamma-aminopropyl triethoxysilane or equivalent used in accordance with the invention should be sufficient appreciably to increase the wet and dry bonding strength between the binder resin and vitreous fibers with which it is used. Aminoalkyl and similar silanes are excellent for use with phenolic, epoxy and aminoplast binder systems. Vinyl and other unsaturated silanes are excellent for use with polyester binder systems. Silanes having an epoxy group in an organic substituent are excellent for use with epoxy and polyester binder systems, and, when the organic substituent is aliphatic, with phenolic binder systems. Generally operable, preferred and optimum proportions for constituents of binder compositions according to the invention are set forth in Table II, below:

TABLE II

| | Composition in parts by weight [1] | | |
|---|---|---|---|
| | Operable range | Preferred range | Optimum range |
| Thermosetting resin or resin composition | 100 | 100 | 100 |
| Gamma-aminopropyl triethoxysilane or equivalent | 0.01–1.0 | 0.05–0.5 | 0.1–0.25 |
| Silicone Copolymer A or equivalent | 0.05–2.0 | 0.1–1.0 | 0.25–0.75 |

[1] On a dry solids basis.

What I claim is:

1. A mass consisting essentially of intermeshed vitreous fibers wherein individual fibers are bonded to one another at points of contact by a plurality of discontinuous bodies of a hardened binder composition present as a coating on the fibers, said hardened binder comprising, on a dry solids basis, 100 parts by weight of a thermoset synthetic organic resin composition selected from the group consisting of phenol-formaldehyde, urea formaldehyde, melamine formaldehyde, dicyandiamide formaldehyde, epoxy and polyester resins, from 0.01 part to 1.0 part by weight of a constituent selected from the group consisting of gamma-aminopropyltrimethoxysilane and gamma-aminopropyltriethoxysilane and from 0.05 part to 2 parts by weight of a silicone copolymer selected from the group consisting of monoalkyl-tri(polyalkoxydialkylsiloxy)-silicone copolymers having the general formula $RSiZ_3$ and such copolymers having the general formula $$\left[\begin{array}{c} R'' \\ | \\ -Si-O-R'-O \\ | \\ R'' \end{array}\right]_n$$

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, $n$ is an integer of at least 2, and each Z includes a polyalkoxydialkylsiloxy radical having the general formula $$-\left(O-\underset{\underset{R}{|}}{\overset{\overset{R}{|}}{Si}}\right)_x-(O-R''')_y-$$

wherein R is an alkyl radical having from 1 to 3 carbon atoms, R''' is an alkylene radical having from 2 to 4 carbon atoms, $x$ is a whole number from 3 to 8, $y$ is a whole number from 8 to about 50, and the terminal $$-(O-R''')-$$

unit of each polyalkoxydialkylsiloxy radical is end-stopped by an alkoxy radical having from 1 to 5 carbon atoms.

2. A mass consisting essentially of intermeshed vitreous fibers wherein individual fibers are bonded to one another at points of contact by a plurality of discontinuous bodies of a hardened binder composition present as a coating on the fibers, said hardened binder comprising, on a dry solids basis, 100 parts by weight of a thermoset synthetic organic resin composition selected from the group consisting of phenol formaldehyde, urea formaldehyde, melamine formaldehyde, dicyandiamide formaldehyde, epoxy and polyester resins, from 0.05 part to 0.5 part by weight of a constituent selected from the group consisting of gamma-aminopropyltrimethoxysilane and gamma-aminopropyltriethoxysilane and from 0.1 part to 1.0 part by weight of a silicone copolymer selected from the group consisting of monoalkyl-tri(polyalkoxydialkylsiloxy)-silicone polymers having the general formula RSiZ$_3$ and such copolymers having the general formula

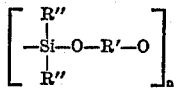

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, $n$ is an integer of at least two, and each Z includes a polyalkoxydialkylsiloxy radical having the general formula

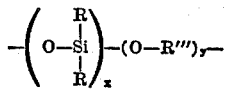

wherein R is an alkyl radical having from 1 to 3 carbon atoms, R''' is an alkylene radical having from 2 to 4 carbon atoms, $x$ is a whole number from 3 to 8, $y$ is a whole number from 8 to about 50, and the terminal

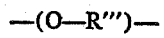

unit of each polyalkoxydialkylsiloxy radical is end-stopped by an alkoxy radical having from 1 to 5 carbon atoms.

3. A mass consisting essentially of intermeshed vitreous fibers wherein individual fibers are bonded to one another at points of contact by a plurality of discontinuous bodies of a hardened binder composition present as a coating on the fibers, said hardened binder comprising, on a dry solids basis, 100 parts by weight of a thermoset synthetic organic resin composition selected from the group consisting of phenol formaldehyde, urea formaldehyde, melamine formaldehyde, dicyandiamide formaldehyde, epoxy and polyester resins, from 0.1 part to 0.25 by weight of a constituent selected from the group consisting of gamma-aminopropyltrimethoxysilane and gamma-aminopropyltriethoxysilane and from 0.25 part to 0.75 part by weight of a silicone copolymer selected from the group consisting of monoalkyl-tri (polyalkoxydialkylsiloxy)-silicone copolymers having the general formula RSiZ$_3$ and such copolymers having the general formula

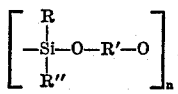

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, $n$ is an integer of at least two, and each Z includes a polyalkoxydialkylsiloxy radical having the general formula

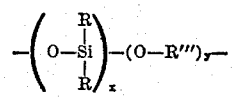

wherein R is an alkyl radical having from 1 to 3 carbon atoms, R''' is an alkylene radical having from 2 to 4 carbon atoms, $x$ is a whole number from 3 to 8, $y$ is a whole number from 8 to about 50, and the terminal —(O—R''')— unit of each polyalkoxydialkylsiloxy radical is end-stopped by an alkoxy radical having from 1 to 5 carbon atoms.

4. A mass consisting essentially of intermeshed vitreous fibers wherein individual fibers are bonded to one another at points of contact by a plurality of discontinuous bodies of a hardened binder composition present as a coating on the fibers, said hardened binder comprising, on a dry solids basis, 100 parts by weight of a thermoset synthetic organic resin composition selected from the group consisting of phenol formaldehyde, urea formaldehyde, melamine formaldehyde, dicyandiamide formaldehyde, epoxy and polyester resins, from 0.01 part to 1.0 part by weight of at least one constituent selected from the group consisting of silanes having the general formula

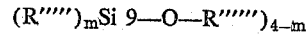

R''''' is an aminoalkyl radical bonded to the silicon atom, R'''''' is an alkyl radical having from 1 to 4 carbon atoms, and $m$ is an integer from 1 to 3, and from 0.05 part to 2 parts by weight of a silicone copolymer selected from the group consisting of monoalkyl-tri(polyalkoxydialkylsiloxy)-silicone copolymers having the general formula RSiZ$_3$ and such copolymers having the general formula

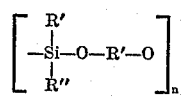

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, $n$ is an integer of at least 2, and each Z includes a polyalkoxydialkylsiloxy radical having the general formula

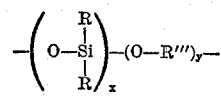

wherein R is an alkyl radical having from 1 to 3 carbon atoms, R''' is an alkylene radical having from 2 to 4 carbon atoms, $x$ is a whole number from 3 to 8, $y$ is a whole number from 8 to about 50, and the terminal —(O—R''')— unit of each polalkoxydialkylsiloxy radical is end-stopped by an alkoxy radical having from 1 to 5 carbon atoms.

5. A mass consisting essentially of intermeshed vitreous fibers wherein individual fibers are bonded to one another at points of contact by a plurality of discontinuous bodies of a hardened binder composition present as a coating on the fibers, said hardened binder comprising, on a dry solids basis, 100 parts by weight of a thermoset synthetic organic resin composition selected from the group consisting of phenol formaldehyde, urea formaldehyde, melamine formaldehyde, dicyandiamide formaldehyde, epoxy and polyester resins, from 0.05 part to 0.5 part by weight of at least one constituent selected from the group consisting of silanes having the general formula

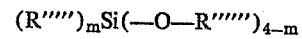

wherein R''''' is an aminoalkyl radical bonded to the silicon atom, R'''''' is an alkyl radical having from 1 to 4 carbon atoms, and $m$ is an integer from 1 to 3, and from 0.1 part to 1.0 part by weight of a silicone copolymer selected from the group consisting of monoalkyl-tri(polyalkoxydialkylsiloxy)-silicone copolymers having the general formula RSiZ$_3$ and such copolymers having the general formula

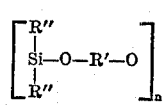

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, n is an integer of at least 2, and each Z includes a polyalkoxydialkylsiloxy radical having the general formula

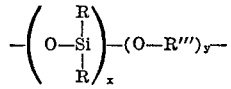

wherein R is an alkyl radical having from 1 to 3 carbon atoms, R''' is an alkylene radical having from 2 to 4 carbon atoms, x is a whole number from 3 to 8, y is a whole number from 8 to about 50, and the terminal —(O—R''')— unit of each polyalkoxydialkylsiloxy radical is end-stopped by an alkoxy radical having from 1 to 5 carbon atoms.

6. A mass consisting essentially of intermeshed vitreous fibers wherein individual fibers are bonded to one another at points of contact by a plurality of discontinuous bodies of a hardened binder composition present as a coating on the fibers, said hardened binder comprising on a dry solids basis, 100 parts by weight of a thermoset synthetic organic resin composition selected from the group consisting of phenol formaldehyde, urea formaldehyde, melamine formaldehyde, dicyandiamide formaldehyde, epoxy and polyester resins, from 0.1 part to 0.25 part by weight of at least one constituent selected from the group consisting of silanes having the general formula $$(R''''')_mSi(—O—R'''''')_{4-m}$$

wherein R''''' is an aminoalkyl radical bonded to the silicon atom, R'''''' is an alkyl radical having from 1 to 4 carbon atoms, and m is an integer from 1 to 3, and from 0.25 part to 0.75 part by weight of a silicone copolymer selected from the group consisting of monoalkyl-tri(polyalkoxydialkylsiloxy)-silicone copolymers having the general formula $RSiZ_3$ and such copolymers having the general formula

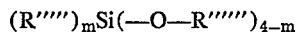

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, n is an integer of at least 2, and each Z includes a polyalkoxydialkylsiloxy radical having the general formula

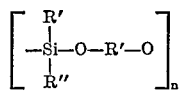

wherein R is an alkyl radical having from 1 to 3 carbon atoms, R''' is an alkylene radical having from 2 to 4 carbon atoms, x is a whole number from 3 to 8, y is a whole number from 8 to about 50, and the terminal

—(O—R''')— unit of each polyalkoxy dialkylsiloxy radical is end-stopped by an alkoxy radical having from 1 to 5 carbon atoms.

7. A mass consisting essentially of intermeshed vitreous fibers wherein individual fibers are bonded to one another at points of contact by a plurality of discontinuous bodies of a hardened binder composition present as a coating on the fibers, said hardened binder comprising, on a dry solids basis, 100 parts by weight of a thermoset synthetic organic resin composition selected from the group consisting of phenol formaldehyde, urea formaldehyde, melamine formaldehyde, dicyandiamide formaldehyde, epoxy and polyester resins, from 0.25 part to 0.1 part by weight of a constituent selected from the group consisting of gamma-aminopropyltrimethoxysilane and gamma-aminopropyltriethoxysilane and from 0.5 part to 2 parts by weight of a monoalkyl-tri(polyalkoxydialkylsiloxy)-silicone copolymer having the general formula $RSiZ_3$ wherein R is an alkyl radical having from 1 to 3 carbon atoms, and each Z includes a polyalkoxydialkylsiloxy radical having the general formula

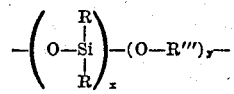

wherein R is an alkyl radical having from 1 to 3 carbon atoms, R''' is an alkylene radical having from 2 to 4 carbon atoms, x is a whole number from 3 to 8, y is a whole number from 8 to about 50, and the terminal —(O—R''')— unit of each polyalkoxydialkylsiloxy radical is end-stopped by an alkoxy radical having from 1 to 5 carbon atoms.

8. A binder composition which is an aqueous dispersion comprising, on a dry solids basis, 100 parts by weight of a thermosettable synthetic organic resin composition selected from the group consisting of phenol formaldehyde resins and phenol formaldehyde resins reacted chemically with at least one of urea, thiourea, melamine and dicyandiamide, from 0.01 part to 1.0 part by weight of a constituent selected from the group consisting of gamma-aminopropylthrimethoxysilane and gamma-aminopropylthriethoxysilane and from 0.05 part to 2 parts by weight of a silicone copolymer selected from the group consisting of monoalkyl-tri(polyalkoxydialkylsiloxy)-silicone copolymers having the general formula $$RSiZ_3$$

and such copolymers having the general formula

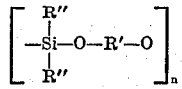

wherein R is an alkyl radical having from 1 to 3 carbon atoms, R' is selected from the group consisting of alkylene radicals having from 2 to 6 carbon atoms and polyoxyalkylene radicals having from 4 to 16 carbon atoms, R'' is an alkyl radical having from 1 to 2 carbon atoms, n is an integer of at least 2, and each Z includes a polyalkoxydialkylsiloxy radical having the general formula

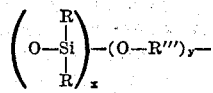

wherein R is an alkyl radical having from 1 to 3 carbon atoms, R''' is an alkylene radical having from 2 to 4 carbon atoms, x is a whole number from 3 to 8, y is a whole number from 8 to about 50, and the terminal —(O—R''')— unit of each polyalkoxydialkylsiloxy radical is end-stopped by an alkoxy radical having from 1 to 5 carbon atoms.

9. A binder composition which is an aqueous dispersion comprising, on a dry solids basis, 100 parts by weight of a thermosettable synthetic organic resin composition selected from the group consisting of phenol formaldehyde resins and phenol formaldehyde resins reacted chemically with at least one of urea, thiourea, melamine, and dicyandiamide, from 0.01 part to 1.0 part by weight of at least one constituent selected from the group consisting of silanes having the general formula $$(R''''')_mSi(—O—R'''''')_{4-m}$$

wherein R''''' is an aminoalkyl radical bonded to the silicon atom, R'''''' is an alkyl radical having from 1 to 4 carbon atoms, and m is an integer from 1 to 3, and from 0.05 part to 2 parts by weight of a silicone copolymer selected from the group consisting of monoalkyl-tri(polyalkoxydialkylsiloxy)-silicone copolymers having the general formula

and such copolymers having the general formula

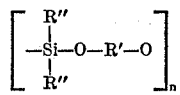

wherein R is an alkyl radical having from 1 to 3 carbon atoms, R' is selected from the group consisting of alkylene radicals having from 2 to 6 carbon atoms, and polyoxyalkylene radicals having from 4 to 16 carbon atoms, R'' is an alkyl radical having from 1 to 2 carbon atoms, $n$ is an integer of at least 2, and each Z includes a polyalkoxydialkylsiloxy radical having the general formula

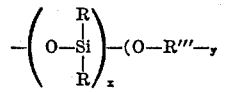

wherein R is an alkyl radical having from 1 to 3 carbon atoms, R''' is an alkylene radical having from 2 to 4 carbon atoms, $x$ is a whole number from 3 to 8, $y$ is a whole number from 8 to about 50, and the terminal —(O—R''')— unit of each polyalkoxydialkylsiloxy radical is end-stopped by an alkoxy radical having from 1 to 5 carbon atoms.

10. A binder composition which is an aqueous dispersion comprising, on a dry solids basis, 100 parts by weight of a thermosettable synthetic organic resin composition selected from the group consisting of phenol formaldehyde resins and phenol formaldehyde resins reacted chemically with at least one of urea, thriourea, melamine and dicyandiamide, from 0.01 part to 1.0 part by weight of a constituent selected from the group consisting of gamma-aminopropyltrimethoxysilane and gamma-aminopropyltriethoxysilane and from 0.5 part to 2 parts by weight of a monoalkyl-tri(polyalkoxydialkylsiloxy)-silicone copolymer having the general formula

wherein R is an alkyl radical having from 1 to 3 carbon atoms, and each Z includes a polyalkoxydialkylsiloxy radical having the general formula

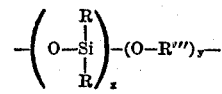

wherein R is an alkyl radical having from 1 to 3 carbon atoms, R''' is an alkylene radical having from 2 to 4 carbon atoms, $x$ is a whole number from 3 to 8, $y$ is a whole number from 8 to about 50, and the terminal —(O—R''')— unit of each polyalkoxydialkylsiloxy radical is end-stopped by an alkoxy radical having from 1 to 5 carbon atoms.

References Cited
UNITED STATES PATENTS

| | | | |
|---|---|---|---|
| 2,834,748 | 5/1958 | Bailey et al. | 260—29.2 |
| 2,990,307 | 6/1961 | Stalego | 260—826 |
| 3,158,519 | 11/1964 | Shannon et al. | 260—29.3 |
| 3,177,170 | 4/1965 | Lund | 260—29.2 |
| 3,305,504 | 2/1967 | Huntington | 260—29.3 |
| 2,972,554 | 2/1961 | Muskat et al. | 51—295 |

DONALD J. ARNOLD, Primary Examiner

U.S. Cl X.R.

117—126 GB, 126 GS; 260—29.2 M, 29.3, 825, 826